Dec. 18, 1962  M. H. GROVE  3,068,940
COMPLETION VALVE AND HANGER ASSEMBLY
Filed Aug. 24, 1960  5 Sheets-Sheet 1

INVENTOR.
MARVIN H. GROVE
BY
ATTORNEYS.

FIG_2_

INVENTOR.
MARVIN H. GROVE

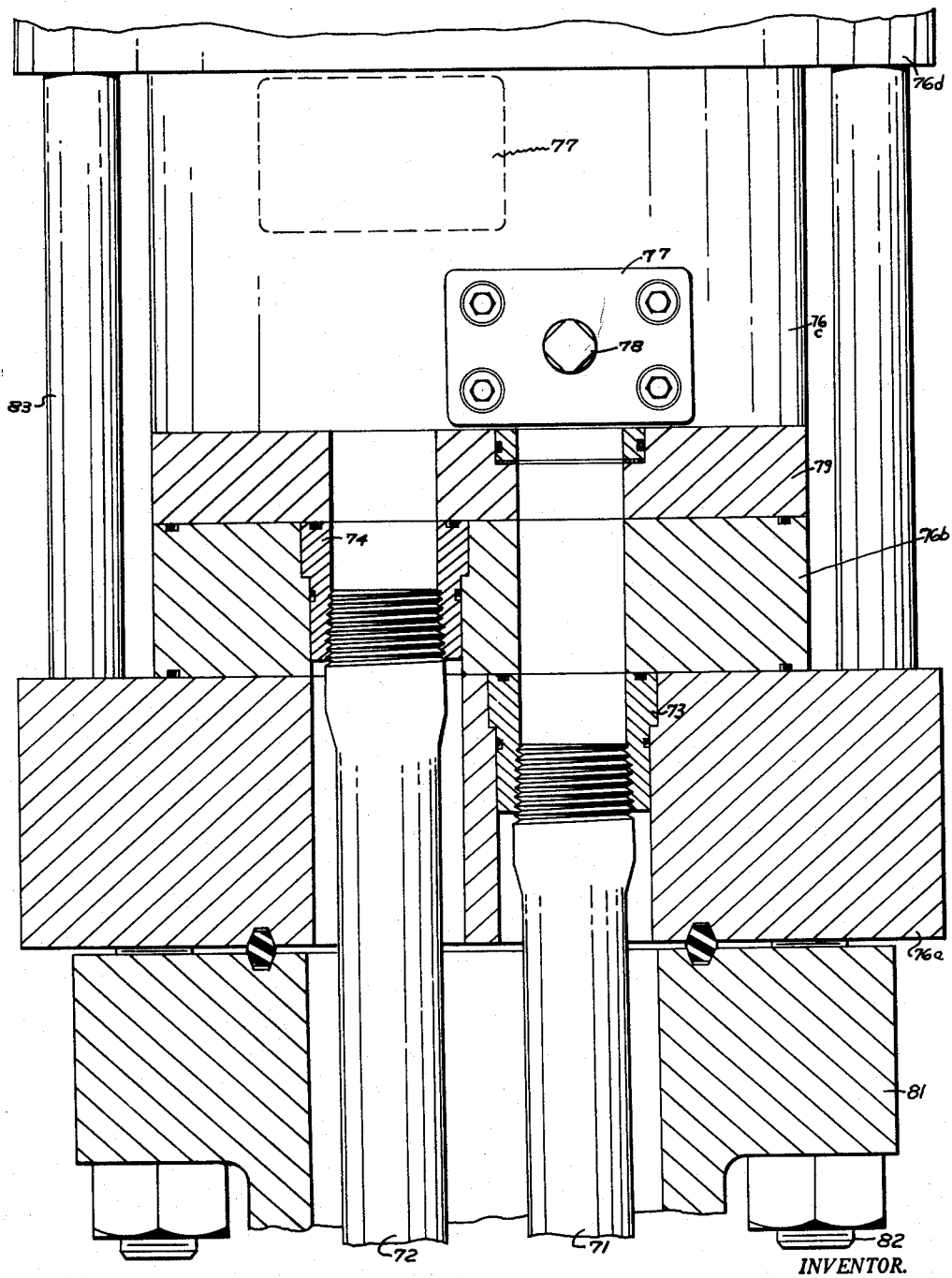
FIG_4_

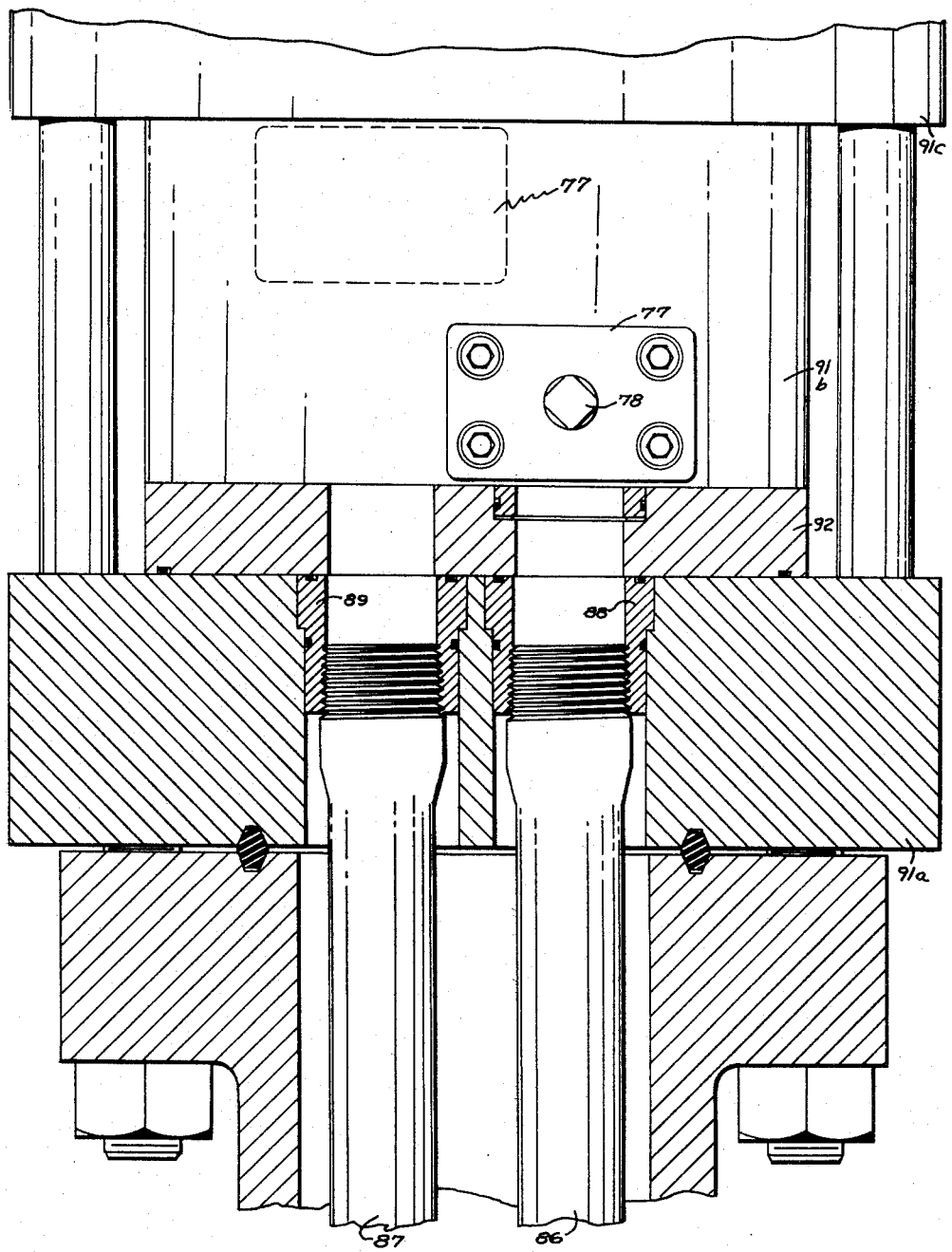
FIG_5_

United States Patent Office 3,068,940
Patented Dec. 18, 1962

3,068,940
COMPLETION VALVE AND HANGER ASSEMBLY
Marvin H. Grove, 340 Hillside Ave., Piedmont, Calif.
Filed Aug. 24, 1960, Ser. No. 51,674
3 Claims. (Cl. 166—97)

This invention relates generally to assemblies such as are used in the petroleum industry on oil and gas producing wells. More particularly it pertains to valve devices for controlling flow from two or more tubing strings, and hanger means whereby the tubing strings are supported.

In the petroleum industry it is common practice to provide two or more strings of tubing which connect with producing areas at different levels, and which are carried at their upper ends by tubing hangers. The tubing hangers are generally incorporated in a hanger head which is mounted upon the well casing. For controlling flow from the tubing, and to permit access for the insertion and removal of tools and other devices, it is common to mount a so called completion valve on the hanger head. A conventional completion valve consists of a solid steel body provided with parallel bores spaced to communicate with the upper ends of the tubing. Valves are carried by the body whereby flow through the two or more passages can be separately controlled. Additional component devices of a Christmas tree assembly may be mounted upon the completion valve, depending upon requirements.

In my co-pending application Serial No. 830,770 filed July 31, 1959, there is disclosed a Christmas tree assembly including a completion valve that is formed from a plurality of body sections each having parallel end faces, and which are assembled one upon the other to form a stacked assembly. The body sections have aligned openings which register to form the desired parallel flow passages, and certain sections carry valve means for controlling flow.

In general it is an object of the present invention to provide a combined completion valve-tubing hanger assembly which makes use of stacked body sections.

Another object of the invention is to provide an assembly of the above character which permits greater flexibility in adapting the same to various operating conditions, and which in particular permits removal of certain portions of the assembly in the event production from one of the tubes is discontinued.

Additional objects and features of the invention will appear from the following description in which the preferred embodiment has been set forth in detail in conjunction with the accompanying drawing.

Figure 1:
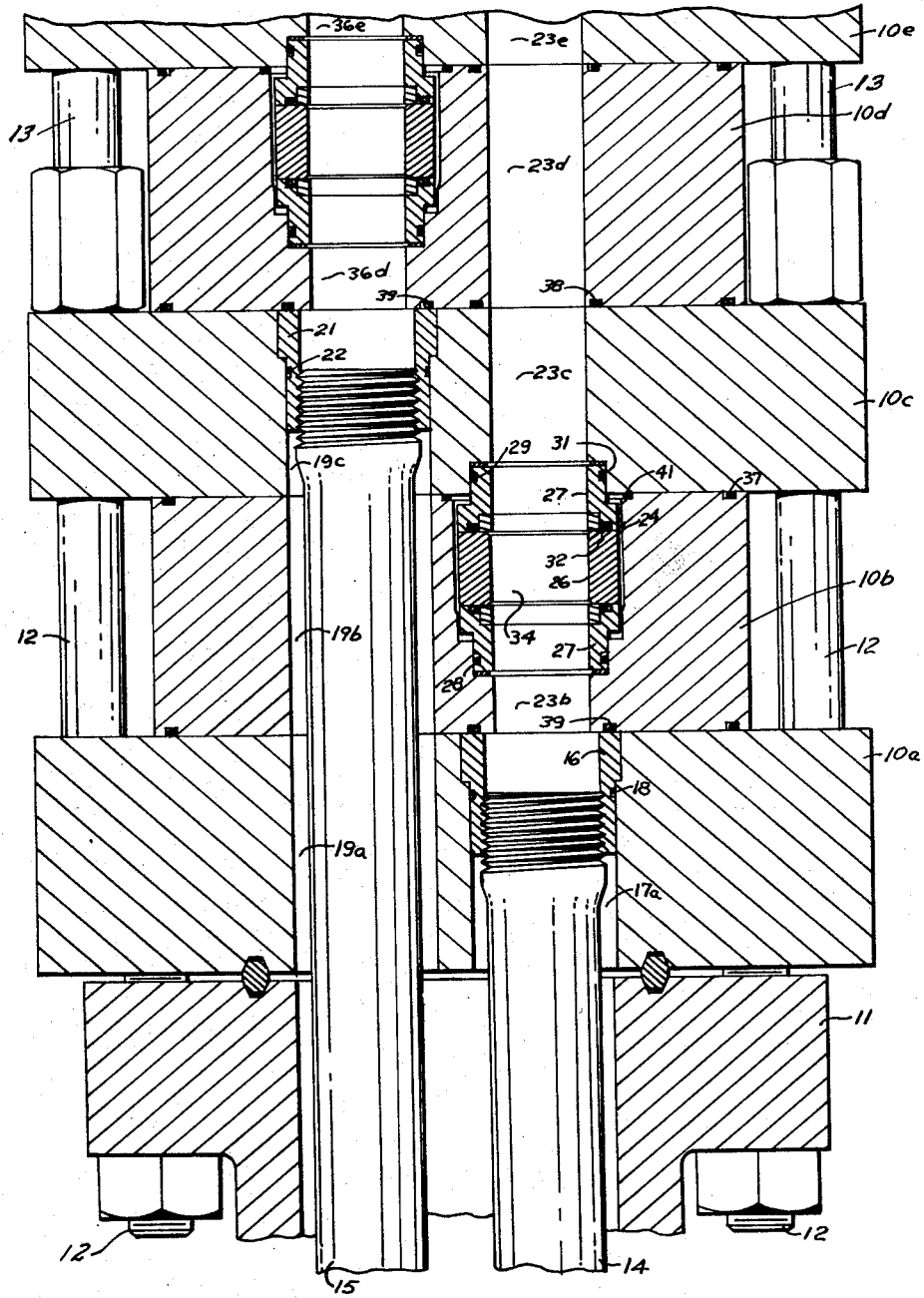
Figure 2:
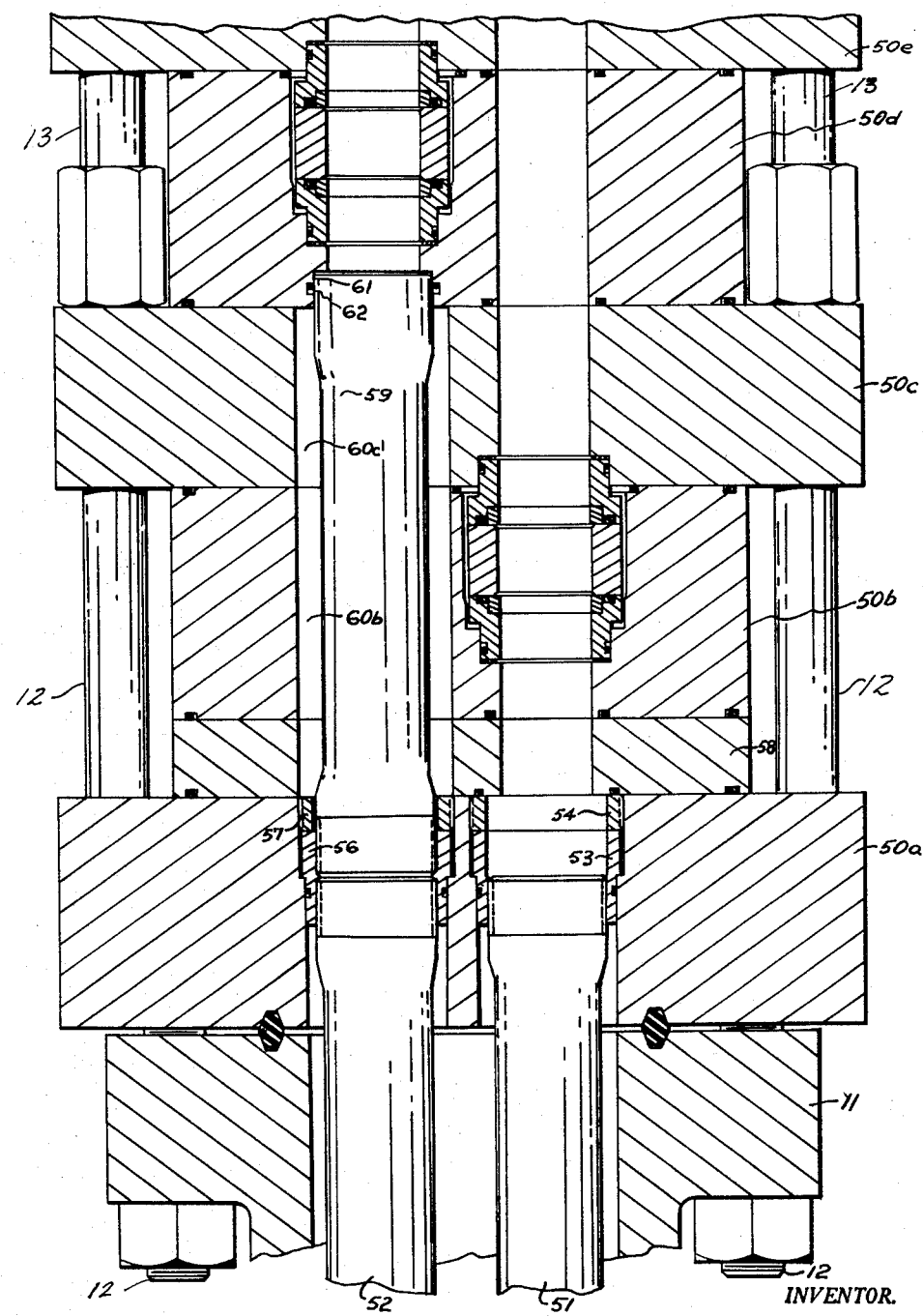
Figure 3:
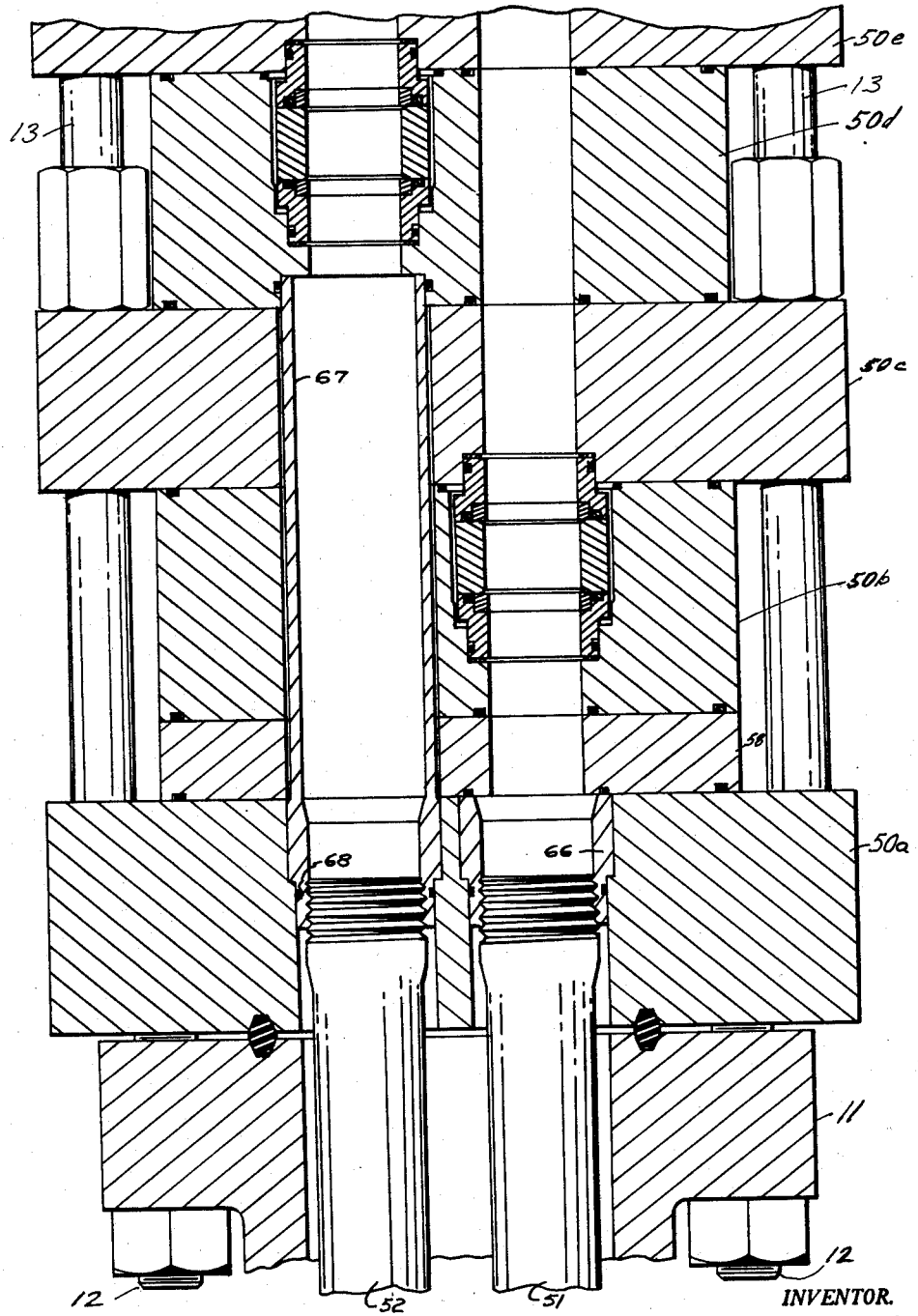

Referring to the drawing:
FIGURE 1 is a side elevational view in section illustrating one embodiment of the invention;
FIGURE 2 is a view like FIGURE 1 but showing a second embodiment;
FIGURE 3 is a view like FIGURE 1 but showing a third embodiment;
FIGURE 4 is a view like FIGURE 1 but showing a fourth embodiment;
FIGURE 5 is a view like FIGURE 1, but showing a fifth embodiment of the invention.

The assembly illustrated in FIGURE 1 consists of a plurality of body sections 10a—10e inclusive. These sections have flat parallel end faces, and they are stacked one upon the other. The lowermost body section 10a is secured to the well head 11 by suitable means, such as bolts 12. Additional stud bolts 13 serve to clamp the remaining body sections together, the arrangement being such that sections 10b and 10e can be separately removed.

Tubes 14 and 15 represent the upper portions of well tubing which connect with producing zones at different levels. The upper end of tube 14 has a threaded engagement with the hanger bushing 16, which is seated within the body bore 17. The bushing is sealed with respect to body section 10a by suitable means such as the resilient O-ring 18.

The tube 15 extends upwardly through the aligned openings 19a, 19b and 19c, in the body sections 10a, 10b and 10c. Its upper end has threaded engagement with the hanger bushing 21, which is seated in the body section 10c, and which is provided with the resilient seal ring 22.

The body section 10b, which is intermediate the body sections 10a and 10c, carries valve means for controlling flow from the tube 14. Also the body section 10d carries valve means for controlling flow from the tube 15. Thus aligned openings 23b, 23c, 23d and 23e are formed in corresponding body sections, and serve to form a continuous straight flow passage that is in alignment with the passage through the tube 14. The valve means in body section 10b can be of the same type as described in the aforementioned co-pending application Serial No. 830,770, filed July 31, 1959, thus the body section is formed with an elongated recess 24 which accommodates the valve gate 26. The flat sides of the gate 26 are engaged by the seat rings 27. One of these rings is disposed within a bore 28 in the body section 10b, and the other is fitted within a bore 29 in the adjacent body section 10c. Sealing means 31 of the resilient O-ring type are shown to prevent leakage between the mounting rings and their corresponding body sections. Also resilient seal rings 32, such as rings of the O-ring type, are carried by the mounting rings and form fluid tight engagement with the sides of the gate. The gate is operatively connected to a threaded stem 33, which extends to the exterior of the body section, where it is adapted to receive operating means such as a hand wheel. The gate is provided with a port 34 adapted to register with the openings 23b and 23c, and the corresponding openings in the mounting rings 27, whereby when the valve is open a straight through passage is formed without obstructions.

The valve means for the body section 10d can be made the same as the valve means just described. This valve means serves to control flow through the aligned openings 36d and 36e, which form a flow passage parallel to the first named flow passage, and communicating with the tube 15.

The body sections are sealed with respect to each other by suitable means such as the seal rings 37 of the O-ring type. Likewise seal rings 38 preferably surround the flow passages, near the mating surfaces of the body sections, and seal rings 39 establish seals between the upper ends of the hanger bushings 16 and 21, and the adjacent body sections. Seal rings 41 surround the gate accommodating recesses 24, and prevent leakage between such recesses, and the other flow passage.

Operation of the embodiment shown in FIGURE 1 is as follows: The parts are assembled as illustrated, and mounted upon the well head 11. Instead of being supported at the same level, as in conventional tubing hangers, the tubes 14 and 15 in this instance are supported at different levels, namely by the body sections 10a and 10c. The valves can be opened to permit access to the tubing strings, and to permit flow from the tubing strings, as desired. In the event the flow from one string ceases, before flow from the other string is exhausted, it is possible to remove parts of the assembly for use on other wells. For example assuming that the tubing string 15 ceases to produce, the assembly comprising body sections 10d and 10e, and parts associated with the same, are removed from the body section 10c, after which the tubing string 15 and its hanger 21 can be removed. Thereafter a suitable head or cap section can be applied to body section 10c, to receive the flow from the tubing 14. During such operations the flow from tubing string 14 is interrupted by closing its associated valve.

In the embodiment of FIGURE 2 the body sections are designated 50a–50e inclusive. The valve means associated with sections 50b and 50d are the same as for the body sections 10b and 10d of FIGURE 1. The well tubes 51 and 52 correspond to the tubes 14 and 15, but it will be noted that the upper ends of these tubes terminate within the body section 50a. The hanger bushing 53 of tube 51 is shown being held in place by the threaded ring 54, and the hanger bushing 56 for tube 52 is similarly clamped in place by ring 57. An adaptor body section 58 is associated with body section 50b, to provide greater thickness.

A tube extension 59 is accommodated in the aligned openings 60b, 60c and has its lower end threaded or otherwise fixed in the bushing hanger 56. The upper end of tube extension 59 is fitted within a counterbore 61 in body section 50d, and is sealed with respect to this body section by suitable means such as a seal ring 62 of the O-ring type.

With the assembly of FIGURE 2 certain parts can likewise be removed from the assembly and one of the tubes removed, when one zone ceases to produce. For example assuming that the zone connected to tube 52 ceases to produce, then sections 50d and 50c, and parts associated with the same, can be removed without disturbing the other parts. Thereafter tube extension 59 can be removed, and a suitable structure mounted upon the body section 50c, to take the flow from the tube 51.

The embodiment of FIGURE 3 is similiar to FIGURE 2. However the hanger bushing 66 for tube 31 is generally the same as bushing 16 of FIGURE 1. The tube extension 67 corresponds to the extension 59 of FIGURE 2, but is lower end portion forms a hanger in which the upper end of tube 52 is threaded. Likewise the lower end portion of the extension 67 is sealed with respect to the body section 50a, as by means of the O-ring seal 68.

FIGURE 4 shows a somewhat simpler version of the invention, which does not utilize some of the features previously described. The tubes 71 and 72 in this instance have their upper ends attached to the hanger bushings 73 and 74, which are carried by the body sections 76a, 76b. Another body section 76c carries two valve means in its opposite ends for controlling flow respectively through the passages in communication with the two tubes. The exterior bonnet plates 77 form a part of the valve means, and the plate illustrated in solid lines is shown associated with a valve stem 78 that is adapted to receive a hand wheel. An adaptor or filler plate 79, is shown associated with body section 76b. The body section 76b corresponds to the body section 10e of FIGURE 1, and may serve to facilitate making connections with flow piping. The lower body section 76a is shown attached to the well head 81, by studs or bolts 82. Stud bolts 83 serve to clamp the remaining body sections together.

With the arrangement shown in FIGURE 4 one tubing string, and the parts associated with the same, may be removed without disturbing the other string, although the valve means cannot be used to shut off the latter string, while string 72 is being removed. This is because one of the control valve means is not disposed in a body section interposed between the sections which carry the tubing hangers, as in FIGURE 1–3.

Another simplified arrangement is shown in FIGURE 5. In this instance the two tubing strings 86 and 87 are attached to hanger bushings 88 and 89, which are both seated within the body section 91a. The adaptor body section 92 separates body section 91 from the body section 91b, which is constructed in the same manner as section 76c of FIGURE 4. In other words it is provided with two valve means for separately controlling flow from the tubing strings 86 and 87. The upper body section 91c corresponds to section 76d of FIGURE 4, and may connect with piping for distributing the flow.

I claim:

1. In an assembly for application to a producing well having at least two well tubes, a plurality of body sections each having parallel end faces, means for clamping said sections one upon the other to form a stacked assembly, well tubing hanger means formed in at least two of said sections for supporting the upper ends of at least two well tubes, the other said sections having openings that are in alignment to form straight flow passages in communication with said tubing hanger means, and valve means disposed in body sections of the assembly for separately controlling flow from said tubes, at least one of said valve means being in a body section that is intermediate said two sections in which said well tubing hanger means are formed.

2. In an assembly for application to a producing well, a plurality of separable body sections each having parallel end faces, means for clamping said sections one upon the other to form a stacked assembly, well tubing hanger means formed in at least two of said sections for separately supporting the upper ends of at least two well tubes at different levels, there being at least one body section interposed between said two body sections having well tubing hanger means formed therein, the body sections having openings that are in registration to form at least two straight parallel flow passages in communication with said tubes, and valve means formed in said interposed body section for opening and closing the flow passage communicating with one of said tubes.

3. In the assembly in claim 2 in which a body section located above said two body sections having well tubing hanger means formed therein is provided with valve means for controlling flow from the other one of said tubes.

References Cited in the file of this patent

UNITED STATES PATENTS

| | | |
|---|---|---|
| 2,335,355 | Penick et al. | Nov. 30, 1943 |
| 2,651,324 | Hodgson et al. | Sept. 8, 1953 |
| 2,859,773 | Wallace | Nov. 11, 1958 |
| 2,885,005 | Rhodes | May 5, 1959 |
| 2,889,886 | Gould | June 9, 1959 |

FOREIGN PATENTS

| | | |
|---|---|---|
| 783,396 | Great Britain | Sept. 25, 1957 |